Aug. 23, 1932.  C. C. ALLEN  1,873,526
LENS TESTING DEVICE
Filed Jan. 30, 1929
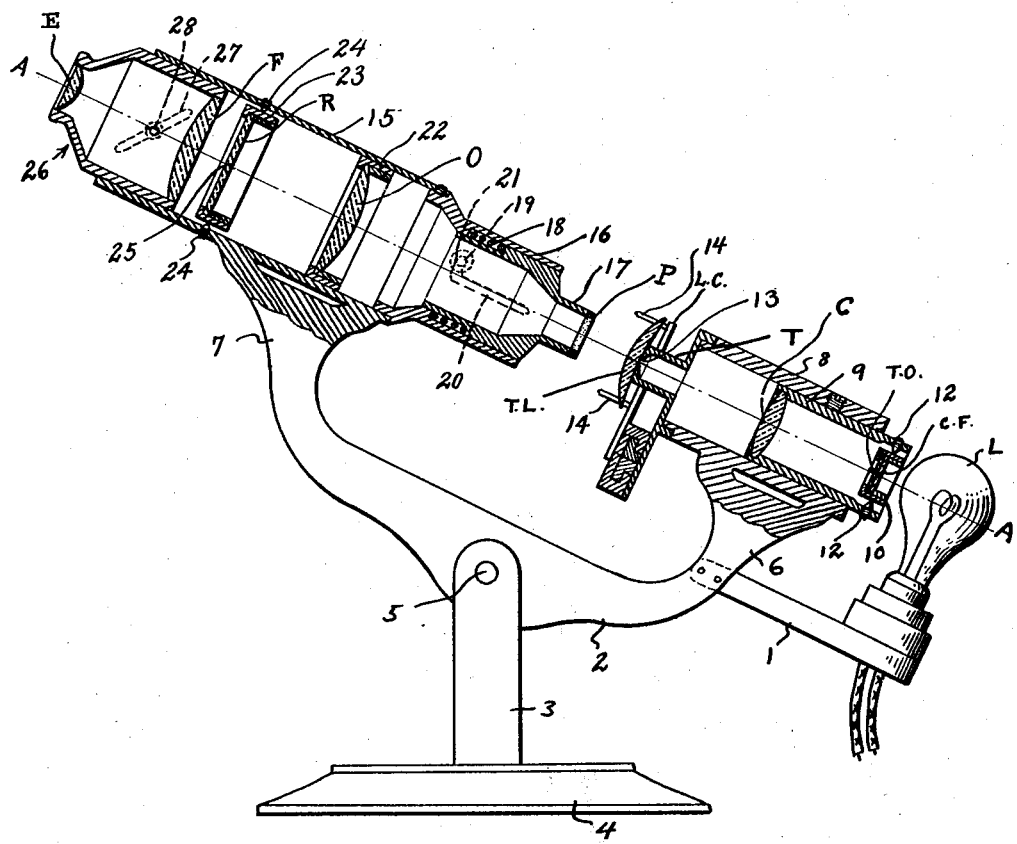
Fig. I.
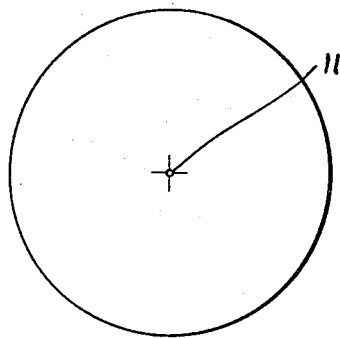
Fig. II.
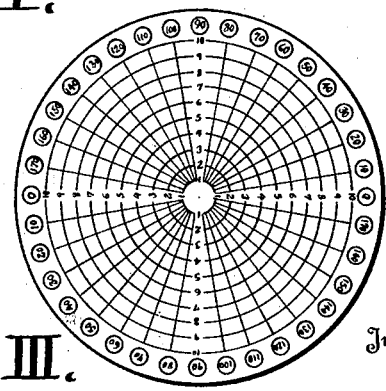
Fig. III.
Inventor
Clile C. Allen.
By Harry H. Styll.
Attorney Patented Aug. 23, 1932

1,873,526

UNITED STATES PATENT OFFICE

CLILE C. ALLEN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS TESTING DEVICE

Application filed January 30, 1929. Serial No. 336,113.

This invention relates to improvements for the testing of ophthalmic lenses and more particularly for the testing of ophthalmic lenses having either a prescribed prism or having a prism produced by error where no prism is prescribed.

The principal object of the invention is to provide improved means for ascertaining the amount and axis of a prism either when prescribed in a lens or when present in said lens by reason of error in the manufacture of the lens.

Another object of the invention is to provide improved means whereby an ophthalmic lens may be analyzed with reference to any prism component, and to determine the value of said prism component.

Another object of the invention is to provide improved means for obtaining the prism power of a tested lens relative to the eye of the user of the lens.

Another object of the invention is to provide improved means in such a device of eliminating undesired light rays.

Another object of the invention is to provide improved means by which the prism component of a lens under test may be indicated visually upon a chart to locate both the amount and axis of said prism component.

Another object of the invention is to provide improved means in such a device that will practically eliminate the effect of sphere or cylinder and make a focusing adjustment unnecessary, while at the same time the deviation caused by prism is unaffected.

Other objects and advantages of the invention will become apparent from the following description taken in connection with the accompanying drawing, and it will be apparent that many changes may be made in the arrangement of parts and details of construction without departing from the spirit of the invention as expressed in the accompanying claims. I, therefore, do not wish to be limited to the exact arrangements and details shown and described as the preferred forms only have been given by way of illustration.

In the drawing:

Fig. I shows a vertical section along the longitudinal axis of an instrument embodying the invention;

Fig. II shows a plan view of the test object;

Fig. III shows a plan view of the locating chart embodied in the instrument of the invention.

In the prescribing of ophthalmic lenses an oculist or one skilled in prescribing lenses for visual errors may specify a prism or the practitioner may indicate the absence of prism by specifying a centered lens. It is well known that an ophthalmic lens may be decentered before the eye of the user and that the effect of such decentration is that of introducing prismatic displacement in the prescription. In those cases where prismatic displacement is required this is, of course, essential, but in those cases where no such prismatic displacement is required such a displacement would indicate an error in the prescribing of the lens to the particular patient, and such an error would be of disadvantage or perhaps injurious to the wearer of the glasses, in that it would cause eye strain. It is, therefore, essential that prescribed lenses after they have been made should be verified to see that the proper prescription has been made into the glasses and such a checking should cover not only the spherical and cylindrical power of the lenses, but the prismatic displacements therein as well.

It is, therefore, the prime object of my invention to produce an instrument of this kind where the power and axis of any prism present in an ophthalmic lens may be ascertained by viewing upon a suitably scaled chart the position of an image, without having recourse to adjustment of the instrument.

Referring to the drawing, wherein similar reference characters indicate corresponding parts throughout: at one end of the instrument embodying the invention is an illuminant L, preferably an electric bulb, which serves to illuminate the test object T. O. This illuminant L, if an electric bulb, is preferably of the frosted or opal type, as a diffused illumination is desirable. This bulb is supported on an extension arm 1 carried by the main frame 2 of the instrument, and is aligned with the longitudinal axis of the instrument. The frame 2 is carried by the support 3 extending from the base 4. The frame 2 is pivoted on the support 3 at the point 5. The frame 2 has two forks 6 and 7. The fork 6 supports the tubular member 8. In the tubular member 8 from the rear end is inserted the ferrule or annular tube 9 having at its forward end the focusing lens C and at its outer end a second ferrule or tubular member 10 in which is inserted the color filter C. F. which is a piece of colored glass, or the like, the color being selected to filter out the rays of light not desired, and superimposed on which is the test object T. O. which is a transparent chart having the central circle and cross line marker 11, Fig. II. This test object is illuminated through the color filter by the illuminant L. The illumination passes through the color filter C. F. which serves to contract the spectral color range and thereby reduce to any desired amount the color aberration of the lens system of simple lenses through which the light radiant from the test object T. O. passes.

The test object T. O. and color filter C. F. are mounted in the ring cell 10 as has been described above and are capable of being adjusted laterally in all meridians by a plurality of adjusting screws 12, as shown in Fig. I. It will be noted that I do not wish to limit myself to this particular position of the color filter as it is obvious that it will be equally efficient when placed at any position between the illuminant and the eye of the observer. The lens C projects an image of the test object through the free end of the thimble T, upon which the lens to be tested T. L. is held in position by a centering lens clip L. C. having a plurality of projecting pins 14 which so engage the tested lens margin as to locate the geometric center of said lens upon the axis A—A of the instrument.

The lens surface in contact with the lens thimble T should coincide at its intersection with the instrument axis with the image of the test object at the plane of the free end of the lens thimble to secure strict accuracy. This is rendered impossible in most cases by reason of the projection of a convex or a concave lens surface into or outward from the lens thimble. Such error may be kept within negligible limits by proper restriction of the lens thimble diameter.

Upon the fork 7 of the arm 2 is a second tube member 15 arranged in axial alignment with the first tube member 8. Projecting axially from this tube 15 towards the lens seat at 13 is a second tube member 16 of lesser diameter into which is slidably fitted a third tube member 17 which is resiliently operable in the tube 16 by means of the spring 18. On the tube 17 is the retaining button 19 which slides in a slot 20 in the tube 16. The slot 20 has an offset 21 so that the tube 17 may be locked in innermost position as relates to the tube 16. It will be noted that when the button 19 is released the tube 17, through the action of the spring 18, will move in the direction of the lens seat at 13 engaging the upper side of the lens T. L. and hold it in place on the testing seat. The tube 17 has a contact pad or cushion P on its outer end to engage the lens and hold it on the lens seat, said pad being of soft material adapted to protect the lens surface from injury.

The spring actuated tube 17, as has been stated, may be released by turning so that the button 19 engaging the slot at its remote end is released so that the tube 17 moves into contact with the adjacent tested lens surface for the purpose of bringing this lens surface normal to the axis A—A of the instrument for the purpose of confining to the remaining lens surface any prism that may be caused by both surfaces not simultaneously being at right angles or normal to the axis A—A of the instrument. Adjacent the tube 17 and in the tube 15 is the objective lens O which serves to form upon the eyepiece reticule an image of the test object T. O. The objective lens O is carried by a ring 22 positioned on the interior of the tube 15. The reticule R is mounted in a ring cell 23 on the inside of the tube 15 and is capable of lateral adjustment in all meridians by means of a plurality of screws 24 engaging its margin. The reticule R carries the chart shown in Fig. III, consisting of the concentric circular lines indicating the prism power and the radial lines indicating the axis of the prism. The center of the chart is located at the point 25, see Fig. I.

The passage of light from the test object T. O. is brought to focus upon the reticule R. The eyepiece 26 consisting of the field lens F and the eye lens E serves to render easily visible the image of the test object T. O. formed upon the reticule R. The eyepiece 26 is adjusted with respect to its distance from the reticule R by means of the spiral slot 27 and the pin 28 therein.

In the adjustment of the instrument the test object T. O. and the reticule R are laterally adjusted as described so that their respective centers lie upon the axis A—A of the instrument. When so adjusted and with no tested lens in the lens clip an image of the central dot of the test object T. O. will be formed at the center of the reticule. When a lens to be tested is interposed on the lens seat as described, this image upon the reticule will be displaced when the lens contains a prism.

As stated above, one of the objects of the invention is to ascertain prism power relative to the eye of the user. The function of the spring actuated tube 17 in positioning the anterior lens surface at right angles to the axis A—A of the instrument is to make possible the determination of prism power.

In Fig. I it will be seen that an aerial image of the central dot of the test object is formed on the reticule R. The positioning of the test lens has practically no influence upon the clarity of the image formed upon the reticule when no test lens is present for the reason that the effect of spherical or cylindrical powers is practically eliminated. After once being located in the instrument the position of the test object T. O. does not have to be changed. The effect of a tested lens upon the clarity of image at the reticule will therefore, be an amount usually negligible and when present in any appreciable amount its effect is to slightly impair the clarity of the image at the reticule but does not impair the accuracy of the test as the position of the image is clearly visible. The concentric circles of the reticule may be such as to denote variation of prism power preferably in terms of prism diopters, while the radial lines seve to locate the axis and direction of base of a prism. The presence of prism in a tested lens will cause the image at the reticule to be formed off the axis and its position relative to any concentric ring on the reticule will serve to indicate its power while its position relative to any radial line of the chart serves to indicate the prism axis and direction of its base. The prism power of the lens to be tested may be measured either from the side of the lens away from the thimble or on the side of the lens contacting with the thimble as desired by making suitable arrangement of the parts. As shown in the drawing with the cross line at T. O. and the reticule R graduated as in Fig. III the prism is measured from the side away from the thimble. To measure from the thimble side put graduations of Fig. III at T. O. and the cross line at R.

In operation the lens to be tested is placed in the lens clip over the lens seat at the orifice 13. The retaining tube 17 is released to hold it in place on the lens seat and the eye of the operator is applied at the eye lens E in the eyepiece 26. The amount of prism, the direction of its base and its axis is indicated by the image 11 of the test object T. O. on the reticule chart R.

It will be understood that the side of the lens under test which rests on the lens seat next to the point 13 is that side of the lens which is nearest the patient's eye when in use and that the lens is so held on this seat by the spring operated tube 17 that the posterior surface is square to the axis A—A of the instrument.

From the foregoing description it will be seen that I have provided simple, efficient and economical means for carrying out all the objects of the invention and particularly providing means by which the power of the prism in a tested lens may be ascertained, its axis and the direction of its base, and by which accuracy of centration of lenses may be determined by measurement of prism power present due to decentration.

Having described my invention, I claim:

1. In a device for testing prism powers of a lens, a lens seat having a restricted orifice for supporting a lens to be tested, a transparent chart having a test object thereon aligned with and separated from the lens seat, a source of light beyond the chart on the side away from the seat, a reticule chart aligned with and spaced from the lens seat on the side away from the light source, and focusing lens means between the test object and reticule chart for forming an image of the test object upon said reticule chart, the said restricted orifice of the lens seat eliminating effective spherical and cylindrical powers from the test.

2. In a device for testing prism powers of a lens, a lens seat having a restricted orifice for supporting a lens to be tested, a transparent chart having a test object aligned with and separated from the lens seat, a source of light beyond the chart on the side away from the lens seat, a reticule chart aligned with and spaced from the lens seat on the side away from the light source, focusing lens means between the test object and reticule chart for forming an image of the test object upon said reticule chart, the said restricted orifice of the lens seat eliminating effective spherical and cylindrical powers from the test, an eyepiece aligned with the focusing lens and means to focus the eyepiece on the reticule chart.

3. A device for testing the prism power of lenses comprising a chart having graduated indicator means thereon, a test object aligned with and positioned at a fixed distance from the chart, means for supporting the lens to be tested between the chart and test object, means for focusing the image of the test object on the chart and means associated with the lens supporting means for eliminating effective spherical and cylindrical powers from the test.

4. A device for testing the prism power of lenses comprising a chart, a test object aligned with and positioned at a fixed distance from the chart, means for supporting a lens to be tested between the chart and test object, means for focusing the image of the test object on the chart and means associated with the lens supporting means for eliminating effective spherical and cylindrical powers from the test, the said chart having scale means thereon for determining the amount and axis of the prism component.

CLILE C. ALLEN.